United States Patent
Matsukawa et al.

(10) Patent No.: US 7,671,289 B2
(45) Date of Patent: Mar. 2, 2010

(54) CAPACITANCE TYPE LIGHT-EMITTING SWITCH AND LIGHT-EMITTING SWITCH ELEMENT USED FOR SUCH CAPACITANCE TYPE LIGHT-EMITTING SWITCH

(75) Inventors: Yosuke Matsukawa, Kyoto (JP); Shuzo Okumura, Kyoto (JP); Ryomei Omote, Kyoto (JP)

(73) Assignee: Nissha Printing Co., Ltd., Kyoto-Shi, Kyoto (JP)

( * ) Notice: Subject to any disclaimer, the term of this patent is extended or adjusted under 35 U.S.C. 154(b) by 321 days.

(21) Appl. No.: 11/908,352

(22) PCT Filed: Jan. 15, 2007

(86) PCT No.: PCT/JP2007/050401

§ 371 (c)(1),
(2), (4) Date: Sep. 11, 2007

(87) PCT Pub. No.: WO2007/083591

PCT Pub. Date: Jul. 26, 2007

(65) Prior Publication Data
US 2009/0050454 A1 Feb. 26, 2009

(30) Foreign Application Priority Data
Jan. 20, 2006 (JP) ............................ 2006-012341

(51) Int. Cl.
*H01H 1/10* (2006.01)
(52) U.S. Cl. ...................................... 200/313; 200/512
(58) Field of Classification Search ......... 200/310–315, 200/512–520; 362/60, 612–615, 623
See application file for complete search history.

(56) References Cited

U.S. PATENT DOCUMENTS

| 4,373,122 A * | 2/1983 | Frame ........................ 200/600 |
| 4,465,911 A * | 8/1984 | Ootsuka ..................... 200/331 |
| 7,098,414 B2 * | 8/2006 | Caldwell .................... 200/310 |
| 7,361,860 B2 * | 4/2008 | Caldwell .................... 200/600 |

FOREIGN PATENT DOCUMENTS

| JP | 10-308135 A | 11/1998 |
| JP | 2001-100186 A | 4/2001 |
| JP | 2006-147519 A | 6/2006 |

OTHER PUBLICATIONS

International Search Report of PCT/JP2007/050401, date of mailing Feb. 6, 2007.
* cited by examiner Primary Examiner—Renee S Luebke
Assistant Examiner—Lisa Klaus
(74) Attorney, Agent, or Firm—Westerman, Hattori, Daniels & Adrian, LLP (57) ABSTRACT

A capacitance type light-emitting switch and a light-emitting switch element are provided that operate properly by preventing failure in entry and for which a small number of parts are used. A light-emitting switch 61 has a light-emitting switch element 51 and a control element 31. A light-emitting switch element 51 has a panel 2 made of transparent materials, a decorated layer 3 arranged on at least one side of the panel, a light guide plate 4 arranged on the back sides of the panel and the decorated layer, a point light source 5 or a line light source arranged on the side of the light guide plate, and a reflective layer 1 that is made of an opaque metal film of less than $1\Omega/cm^2$ of surface resistance measured by the four-point probe array measurement method, mounted on the back side of the light guide plate, and is formed to have an electrode unit 1a and a conductive unit 1b connected to the electrode unit. The control element 31, which is connected to the electrode unit 1a through the conductive unit 1b, switches a circuit/circuits for an external loading device, depending on the change in the capacitance of the electrode unit.

10 Claims, 5 Drawing Sheets

CAPACITANCE TYPE LIGHT-EMITTING SWITCH AND LIGHT-EMITTING SWITCH ELEMENT USED FOR SUCH CAPACITANCE TYPE LIGHT-EMITTING SWITCH

TECHNICAL FIELD

The present invention relates to a capacitance type light-emitting switch and a light-emitting switch element used for such capacitance type light-emitting switch.

BACKGROUND ART

Figure 15:
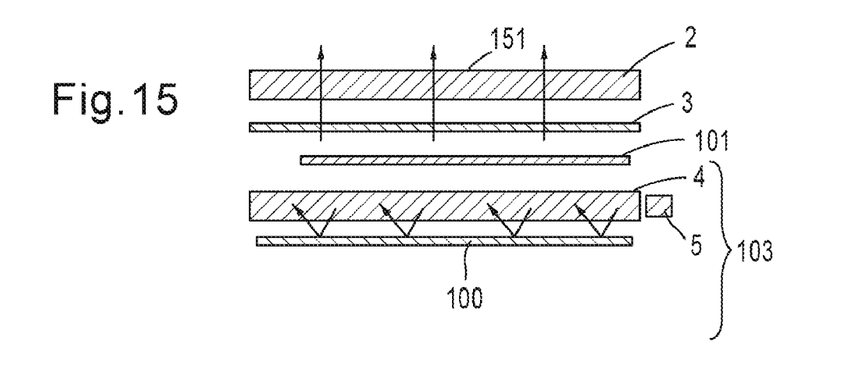
FIG. 15 is an exploded cross-sectional view of a prior art light-emitting switch element.
Figure 16:
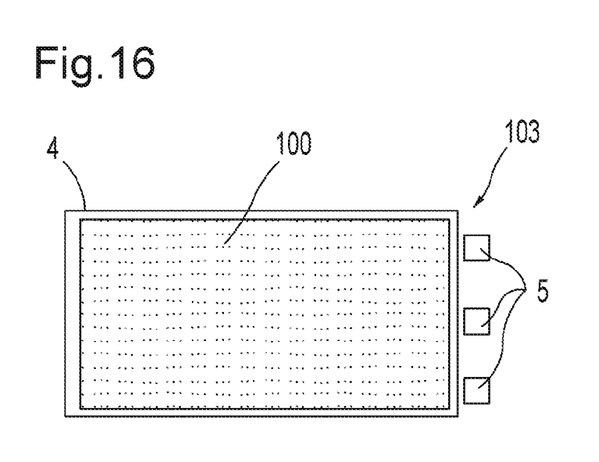
FIG. 16 is a back view showing the formation of a reflecting layer for the light emitter in FIG. 15.

The previously known capacitance type input devices such as disclosed in patent document 1 have been used, for example, for front panels of audio instruments, television sets, and washing machines etc. FIG. 15 shows one example of such capacitance type input devices, i.e., a light-emitting switch element 151 has a panel 2 made from transparent material, a decorated layer 3 arranged on at least one side of the panel 2, a transparent electrode 101, which is a transparent conducting layer, arranged on the back side of the panel 2, and a light-emitting portion 103 arranged on the most back surface of the panel 2. In general, a edge light type surface light source, in which a point light source 5 or a line light source is arranged on the side of a light guide plate 4 and a reflecting layer 100 is arranged on the back side of the light guide plate 4, is used as a light emitter 103 (refer to FIGS. 15 and 16).

The conventional light-emitting switch element 151 described above is used as a conventional capacitance type light-emitting switch by connecting the transparent electrode 101 to a control element (not illustrated).

In the capacitance type light-emitting switch of the configuration described above, if a finger touches the top surface of the switch or if a finger comes close to the switch, it causes the change in the capacitance of the transparent electrode 101. This change is detected with the control element, which then switches a circuit for an external loading device.

In the panel of the light-emitting switch element, the decorated layer 3 is displayed or not displayed by turning the light source on or off. In display of the decorated layer 3, in some cases light is shined on the whole region of the panel and in other cases light is shined on a certain region of the panel. In the latter case, characters, figures, graphics, marks, patters, etc. are often displayed on such a certain region.

Patent document1: Publication of unexamined utility model applications No. S61-89941

DISCLOSURE OF THE INVENTION

Problem to be Solved by the Invention

However, in the conventional capacitance type light-emitting switch, the use of a high conductive ITO film as a transparent electrode deteriorates the sensitivity. If a thick panel is arranged at the front side of the transparent electrode 101, the sensitivity becomes worse. This may prevent reliable entry, thus causing improper operation.

Furthermore, a large number of parts are used for the conventional capacitance type light-emitting switch, thereby making its fabrication process cumbersome and complicated. Still furthermore, an ITO layer is needed. Consequently, production cost may increase. The use of a large number of parts, in particular, may inhibit reduction in size and weight and thickness.

Therefore, it is an object of the present invention to provide a capacitance type light-emitting switch that has high sensitivity and operates properly. It is another object of the present invention to provide a capacitance type light-emitting switch for which a smaller number of parts are used. It is still another object of the present invention to provide a capacitance type light-emitting switch element that is capable of transmitting the change in capacitance to a control element reliably. It is still another object of the present invention to provide a capacitance type light-emitting switch element for which a smaller number of parts are used.

Method to Achieve the Object

To achieve the aforementioned object, the present invention is constructed as follows:

There is provided a capacitance type light-emitting switch comprising:

a light-emitting switch element comprising
    a panel made of transparent materials,
    a decorated layer arranged on at least one side of the panel,
    a light guide plate arranged on the back sides of the panel and the decorated layer, a point light source or a line light source arranged on the side of the light guide plate, and
    a reflective layer that is made of an opaque metal film of less than $1\Omega/cm^2$ of surface resistance measured by the four-point probe array measurement method, mounted on the back side of the light guide plate, and is formed to have an electrode unit and a conductive unit connected to the electrode unit; and a control element that is connected to the electrode unit through the conductive unit, being capable of switching a circuit for an external loading device, depending on the change in the capacitance of the electrode unit.

The light-emitting switch element of the present invention is a light-emitting switch element used as configuration part of a capacitance type light-emitting switch, comprising,
    a panel made of transparent materials,
    a decorated layer arranged on at least one side of the panel,
    a light guide plate arranged on the back sides of the panel and the decorated layer,
    a point light source or a line light source arranged on the side of the light guide plate, and
    a reflective layer that is made of an opaque metal film of less than $1\Omega/cm^2$ of surface resistance measured by the four-point probe array measurement method, mounted on the back side of the light guide plate, and is formed to have an electrode unit and a electric conductor connected to the electrode unit.

There is provided a light-emitting switch element with the configuration described above, wherein the reflecting layer is integrally formed on the back side of the light guide plate.

The light-emitting switch element of the present invention is a light-emitting switch element used as configuration part of a capacitance type light-emitting switch, comprising,
    a panel made of transparent materials,
    a decorated layer arranged on at least one side of the panel,
    a light guide plate arranged on the back side of the panel and the decorated layer,
    a point light source or a line light source arranged on the side of the light guide plate,
    a reflective layer that is made of an opaque metal film of less than $1\Omega/cm^2$ of surface resistance measured by the four-point probe array measurement method, mounted on the back side of the light guide plate, and is formed to have an electrode unit, and
    an electric conductor connected to the electrode unit of the reflective layer.

There is provided a light-emitting switch element with the configuration described immediately above, wherein the reflecting layer and the conductive unit are integrally formed on the back side of the light guide plate.

There is provided a light-emitting switch element with any one of the configurations described above, wherein the reflecting layer is formed to have a non-conductive unit further.

There is provided a light-emitting switch element with any one of the configurations described above, wherein the material of the metal film is any one of silver, copper, aluminum, gold, nickel, and stainless steel.

There is provided a light-emitting switch element with any one of the configurations described above, wherein the front surface of the metal film is coated with a dielectric enhanced reflection film.

There is provided a light-emitting switch element with any one of the configurations described above, wherein the reflecting layer is formed to have two or more electrode units described above.

There is provided a light-emitting switch element with any one of the configurations described above, wherein two or more light guide plates described above are arranged and there are two or more kinds of formation patterns for the reflecting layer.

Effect of the Invention

In the capacitance type light-emitting switch of the present invention, the reflecting layer of the edge light type surface light source is made of an opaque metal film of less than $1\Omega/cm^2$ of surface resistance measured by the four-point probe array measurement method and is formed to have an electrode unit, which formation allows the reflecting layer to function as an electrode as well. Therefore, in the capacitance type light-emitting switch of the present invention, the electrode unit is low in resistance, thus improving entry sensitivity. As a result, there occurs no improper operation caused by failure in entry. Furthermore, because the reflecting layer of the capacitance type light-emitting switch of the present invention functions as an electrode as well, there is no need to arrange an electrode in addition to the reflecting layer. This advantage may reduce the number of parts to be used, thus making manufacturing and assembly easy and also producing a high cost-effectiveness.

In the light-emitting switch element of the present invention, the reflecting layer of the edge light type surface light source is made of an opaque metal film of less than $1\Omega/cm^2$ of surface resistance measured by the four-point probe array measurement method and is formed to have an electrode unit, which formation allows the reflecting layer to function as an electrode as well. Therefore, in the light-emitting switch element of the present invention, the electrode unit and/or the conductive unit are low in resistance, thus being capable of transmitting the change in the capacitance of the electrode unit to the control element with reliability.

Furthermore, because the reflecting layer of the capacitance type light-emitting switch of the present invention functions as an electrode as well, there is no need to arrange an electrode in addition to the reflecting layer. This advantage may reduce the number of parts to be used, thus making manufacturing and assembly easy and also producing a high cost-effectiveness.

DESCRIPTION OF REFERENCE NUMERALS

1 Reflecting layer
1a Electrode unit
1b Conductive unit
1c Non-conductive part
2 Panel
3 Decorated layer
4 Light guide plate
5 Point light source
6 Light emitter
7 Electric conductor
31 Control element
32 External loading device
51 First light-emitting switch element
52 Second light-emitting switch element
53 Third light-emitting switch element
54 Fourth light-emitting switch element
55 Fifth light-emitting switch element
56 Sixth light-emitting switch element
61 Capacitance type light-emitting switch
81 Finger
100 Reflecting layer
101 Transparent electrode
103 Light emitter
151 Light-emitting switch element

MOST PREFERRED EMBODIMENT TO CARRY OUT THE INVENTION

Referring to the drawings, a description shall now be provided of an exemplary embodiment of the present invention.

Figure 1:
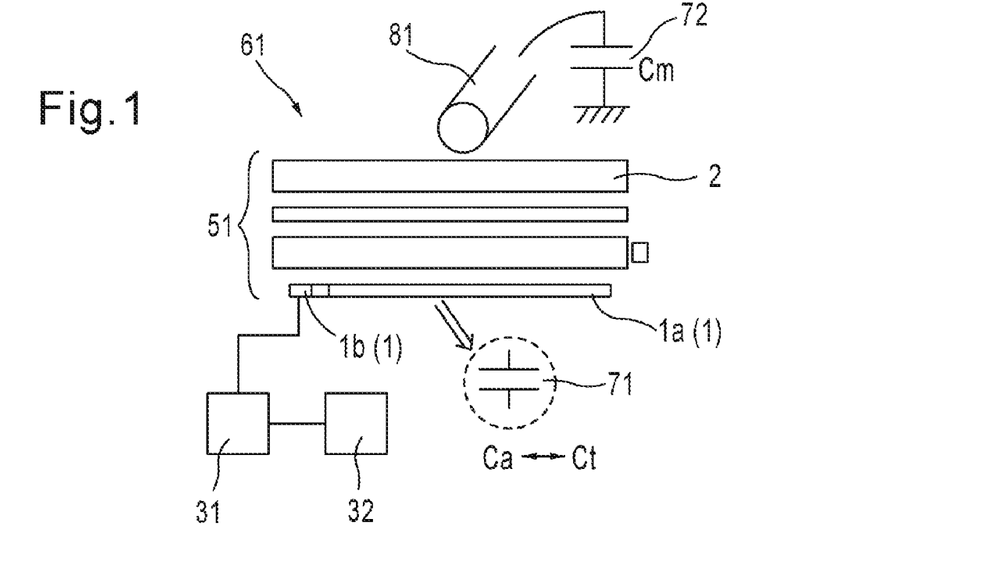
FIG. 1 is an explanation of a capacitance type light-emitting switch 61 of the present invention.
Figure 2:
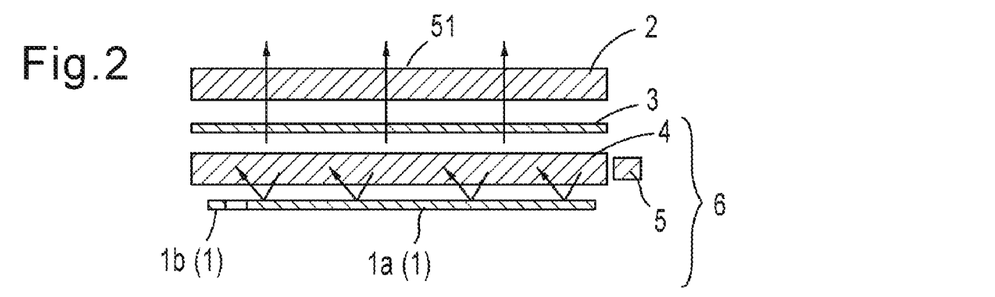
FIG. 2 is an exploded cross-sectional view of a first light-emitting switch element 51 of the present invention.
Figure 3:
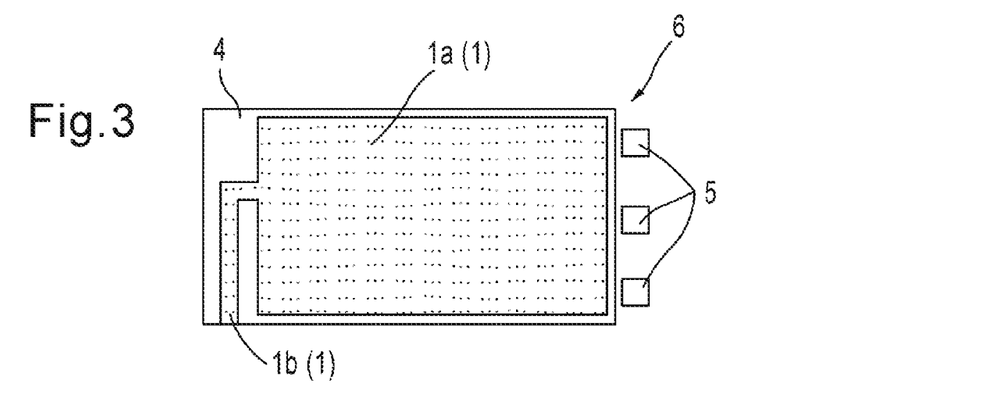
FIG. 3 is a back view showing the formation of a reflecting layer for the light emitter in FIG. 2.

FIG. 1 is an explanation of a capacitance type light-emitting switch 61 of the present invention. FIG. 2 is an exploded cross-sectional view showing an embodiment of a light-emitting switch element 51 of the present invention. The first light-emitting switch element 51 is one of the components that construct the capacitance type light-emitting switch 61. FIG. 3 is a back view showing the formation of a reflecting layer 1 for a light emitter 6 in FIG. 2.

A control element 31 includes an oscillating circuit, a checking circuit, and a circuit-switching circuit. An oscillating circuit is connected through a conductive unit 1b to an electrode unit 1a. The oscillating circuit changes the oscillating frequency, depending on the value of capacitance of the electrode unit 1a.

The checking circuit operates to detect and check the change in the oscillating frequency of the oscillating circuit. The circuit-switching circuit switches a circuit/circuits for the external loading device 32, according to the check results carried out by the checking circuit. The circuit-switching circuit includes, for example, a relay circuit. The circuit-switching includes, for example, switching on and off of one electric circuit and sequential switching of one electric circuit to three or more electrical circuits. The external loading device includes, for example, a television set and a washing machine and includes also, for example, a power supply circuit for a point light source 5 of the light-emitting switch element.

A description will be provided of how the capacitance type light-emitting switch 61 operates. For explanation, a condenser equivalent material including an electrode unit 1a(1) is a condenser D71, and a condenser equivalent material including the body of an operator is a condenser H72.

When nothing is in touch with the top surface layer of the light-emitting switch element, i.e., a panel 2 in this embodiment, or when there is nothing very close to the top surface layer of the light-emitting switch element, the condenser D71 has a capacitance of Ca. The oscillating circuit oscillates with a frequency of Fa, depending on Ca. When a finger 81 of an operator touches, or is very close to, the panel 2, a capacitance Cm of the condenser H72 gives a change to the capacitance of the condenser D71. As a result, the capacitance of the condenser D71 changes to Ct, and the oscillating frequency of the oscillating circuit changes from Fa of the previous value to Ft. The checking circuit detects and checks the change of the oscillating frequency from Fa to Ft, and then the circuit-switching circuit switches a circuit/circuits for the external loading device.

The first light-emitting switch element 51 comprises a panel 2 made from transparent materials, a decorated layer 3 arranged on at least one side of the panel 2, a light guide plate 4 arranged at on the back sides of the panel 2 and the decorated layer, a point light source 5 arranged on the side of the light guide plate 4, and reflective layer 1 that is made of an opaque metal film of less than 1Ω/cm² of surface resistance measured by the four-point probe array measurement method arranged on the back side of the light guide plate 4, and is formed to have an electrode unit 1a and a conductive unit 1b connected to the electrode unit 1a. "(1)" of reference numerals 1a(1), 1b(1), etc. means that the electrode unit 1a and the conductive unit 1b are part of the reflecting layer 1. The same holds true for the reference numerals shown in FIG. 4 and other figures later.

The panel 2, which is used, for example, for three-dimensional covers of cellular phones, digital cameras, portable players, etc. and for front panels of audio devices, television sets, washing machines, etc., is not limited to flat plate in terms of shape. That is to say, the panel 2 may be, for example, in the shape of flat plate, curved surface, and plate with different thickness. As materials of the panel 2, polystyrene resin, polyolefin resin, ABS resin, AS resin, AN resin, and other general-purpose resin may be used. Polyphenylene oxide polystyrene resin, polycarbonate resin, polyacetal resin, polyacryl resin, polycarbonate modified polyphenylene ether resin, polybutylene terephthalate resin, polybutylene terephthalate resin, ultrahigh molecular weight polyethylene resin, and other general-purpose engineering resin may be also used.

The decorated layer 3 is a layer that works to decorate the panel 2. The decorated layer 3 is, for example, formed as a colored ink layer. As materials of the colored ink layer, colored ink may be used, which contains properly colored pigments or dyes as colorant and also contains resin, such as polyvinyl chloride resin, polyamide resin, polyester resin, polyacryl resin, polyurethane resin, polyvinyl acetal resin, polyester-urethane resin, cellulosic ester resin, and alkyd resin, as binder. As formation method of colored ink layers, usual printing, for example, offset printing, gravure printing and screen printing, and painting may be used. The manner to form the decorated layer 3 is not limited the direct formation described above. The decorated layer 3 may form indirectly, as well. Namely, the decorated layer 3 may formed on the panel 2 by the transfer method, the simultaneous inmold transfer method, the insert method, the laminate method or other methods after it was temporarily formed on a substrate film. The decorated layer 3, without being integrally formed on the panel 2, may be first formed on a substrate film, and then the formed decorated layer 3 may be superposed on the panel 2. The decorated layer 3 may be arranged on the front side or both sides of the panel 2. These mutual arrangement aspects of the decorated layer 3 and the panel 2 are not shown in figures.

Figure 14:
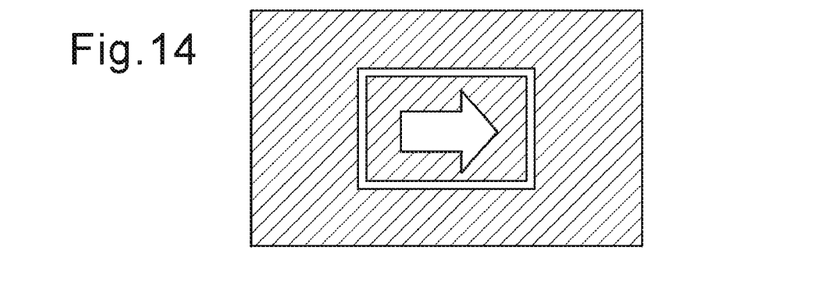
FIG. 14 is a plan view showing an example of illumination and display of a light-emitting switch element of the present invention.

The decorated layer 3 may be also arranged so that it can shield part of the panel. In this case, only a certain part, or only the area around a certain part, such as characters, figures, graphics, marks, and patterns, are illuminated and displayed. FIG. 14 is a plan view of an example of illumination and display in the light-emitting switch element of the present invention. This figure shows that the panel surface evenly decorated by the decorated layer 3, except the area of "arrow" and "frame," is shielded when the light emitter 6 is turned on. In the figure, the plain area is the area that is displayed, whereas the diagonally shaded area is the area that is shielded.

The light guide plate 4 works to conduct the light, which was introduced from the side, toward the deep by total reflection and to emit part of the light from the front surface. High refractive-index and high internal reflective resin, such as acrylic resin and polycarbonate resin, and light-condensing plastic the light-condensing ratio of which is improved at the side thereof by adding fluorescent pigment to the resin, may be used as the light guide plate 4. The light guide plate 4 is not limited to flat plate in terms of shape. That is to say, the light guide plate 4 may be, for example, in the shape of flat plate, curved surface, and differently thick plate. Optical sheets, including diffusion sheet and lens sheet, may be arranged on the top surface of the light guide plate 4 in order to improve uniformity of brightness and light intensity.

A light-emitting diode (LED) etc. may be used as the point light source 5. A line light source such as a cathode-ray tube may be used instead of the point light source 5.

The reflecting layer 1 works to reflect light, which came from the light guide plate 4, back to the light guide plate 4 and also to reflect light, which came from the light guide plate 4, and then emit the reflected light from the front of the light guide plate 4 (the arrows in FIG. 2 indicate the direction in which the light goes, and also do the arrows in FIGS. 4, 6, 8, 10, and 12). The reflecting layer 1 comprises an opaque metal film. Opaque metal films provide, on its own, a light reflectivity needed for the present invention. The use of silver, copper, aluminum, gold, nickel, stainless steel, etc. as materials of the metal film enables high reflectivity and also improves efficiency in illumination and display. The reflecting layer 1 may have one metal film layer formed thereon, and it may have also two or more of metal film layers formed thereon. In the case that the reflecting layer 1 has a plurality of metal film layers formed thereon, for a high reflectivity, the metals described above will do as a material of the metal film nearest to the light guide plate 4.

In the present invention, the reflecting layer 1 serves as that electrode of a capacitance type switch element which detects the change in capacitance, because the metal film that constructs the reflecting layer 1 is formed to have the electrode unit 1a and the conductive unit 1b connected to the electrode unit 1a (refer to FIG. 2). This means that in addition to the reflecting layer 1, there is no necessity for an electrode to be arranged. As a result, a smaller number of parts may be used, compared with prior arts. Furthermore, because the reflecting layer 1 has a surface resistance of less than $1\Omega/cm^2$ measured by the four-point probe array measurement method, there may be provided a high-sensitive, rarely malfunctioning contact detecting function, even if the panel 2 arranged on the front side of the electrode unit 1a becomes thicker, or even if the panel 2 is arranged on the front side of the electrode unit 1a, with clearance created between them. A metal film with a surface resistance of less than $1\Omega/cm^2$ may be obtained by choosing a material and film thickness appropriately.

For example, aluminum with a film thickness of 1 μm, which has a surface resistance of less than $1\Omega/cm^2$, meets necessary requirements for the reflecting layer 1 of the light guide plate 4. In other words, a reflecting layer made of an opaque metal film serves as both a reflecting layer and an electrode unit, with no necessity of extra manufacturing processes.

The surface resistance was measured according to JIS K 7194:1994 "Testing method for resistivity of conductive plastics with a four-point probe array."

The metal layer may be formed by the vacuum deposition method, the spattering method, the ion plating method, the plating method, the metal foil pasting method, and other methods. The metal layer formed by one or more of the methods described above is patterned to obtain the electrode unit 1a and the conductive unit 1b. For example, a resist film having a certain pattern is formed by exposing a photoresist film, which was formed on a metal film, using a photomask, and then by developing the exposed photoresist film, using developer, or a resist film having a certain pattern is printed on a metal film by the screen printing method, the gravure printing method, the inkjet printing method or other methods. After that, part of the metal film not covered by the resist layer is removed, using etching liquid. The reflecting layer 1, without being integrally formed on the back side of the light guide plate 4, may be first formed on a substrate film, and then the formed reflecting layer 1 may be superposed on the back side of the light guide plate 4. As still another example, the reflecting layer 1 may be integrally formed on the back side of the light guide plate 4. As still another example, the metal film may be not only directly formed on the back side of the light guide plate 4, but also indirectly formed on the back side of the light guide plate 4 by the transfer method, the simultaneous inmold transfer method, the insert molding method, the laminate method or other methods after it was temporarily formed on a substrate film.

The integral formation of the reflecting layer 1 on the back side of the light guide plate 4 (including the case in which a reflecting layer is formed to have both an electrode unit and a conductive unit and the case in which a reflecting layer is formed to have the electrode unit and has an electric conductor connected the electrode unit) may further reduce the number of parts to be used for the capacitance type light-emitting switch and the light-emitting switch element.

In the light-emitting switch element of the present invention, an opaque metal film that constructs the reflecting layer 1 may be formed to have no conductive unit 1b. In other words, the light-emitting switch element of the present invention comprises a panel 2 made of transparent material, a decorated layer 3 arranged on at least one side of the panel 2, a light guide plate 4 arranged at on the back sides of the panel 2 and the decorated layer 3, a point light source 5 or a line light source arranged on the side of the light guide plate 4, a reflecting layer 1 that is made of an opaque metal film of less than $1\Omega/cm^2$ of surface resistance measured by the four-point probe array measurement method arranged on the back side of the light guide plate 4, and is formed to have an electrode unit 1a, and a electric conductor 7 connected to the electrode unit 1a of the reflecting layer 1 (refer to FIGS. 8 and 9).

Figure 8:
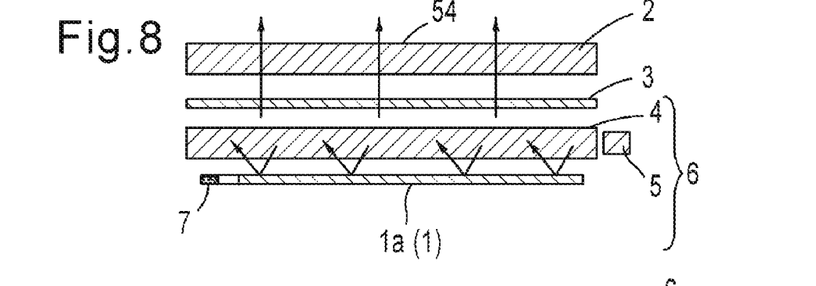
FIG. 8 is an exploded cross-sectional view of a fourth light-emitting switch element 54 of the present invention.
Figure 9:
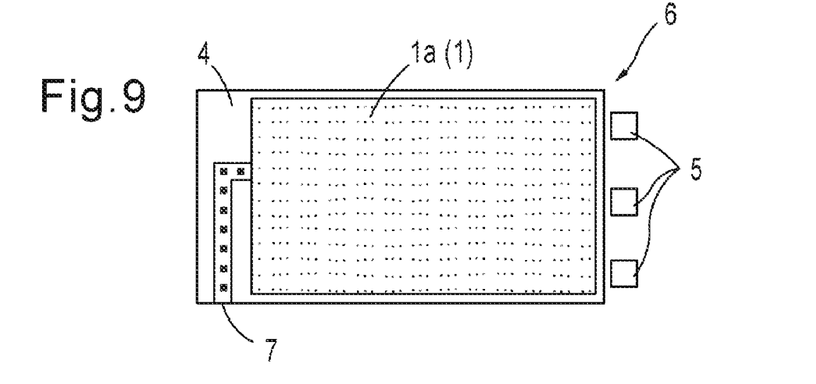
FIG. 9 is a back view showing the formation of a reflecting layer for the light emitter in FIG. 8.

In the fourth light-emitting switch element 54 shown in FIG. 8, an electrode unit 1a(1) is connected to an electric conductor 7. This configuration has an advantage that when the whole area of a panel is illuminated and displayed, a reflecting layer can be formed on the whole surface of a light guide plate 4. Another advantage is that the reflecting layer may be freely formed anywhere, according to the desired region for illumination and display in the panel.

The electric conductor 7 is formed by the screen printing method, the inkjet printing method, the blade coating method, the bar coating method and other methods, using paste in which conductive microparticles such as carbon and silver are dispersed. In the case that, as described above, the reflecting layer 1 is indirectly formed on the back side of the light guide plate 4 by the transfer method, the simultaneous inmold transfer method, the insert method, the laminate method or other methods, the electric conductor 7, together with the reflecting layer 1, is formed on a substrate film. A flexible board on which electric conductive material is deposited, may be used as the electric conductor 7. The flexible board may connect to the end of the electrode unit 1a by soldering.

High reflectance can be achieved by coating the front surface of an opaque metal film with a dielectric enhanced reflection film as well. An enhanced reflection film is a film that has high refractive-index dielectric thin films and low refractive-index dielectric thin films alternately multi-layers composed thereon by optically effective film thickness of each thin film in order to achieve a high reflectance. For example, high reflectance can be achieved over the wide wavelength region by multi-layers composing a $TiO_2$ layer and a $SiO_2$ layer alternately several times or more.

In the light-emitting switch element of the present invention, the reflecting layer 1 may be formed to have two or more electrode units 1a. That is to say, there may be two or more switches. In this case, there are two or more detection regions, resulting in a switch capable of switching two or more circuits. In addition, the illumination/display function is single, and for the illumination/display in the detection region, two or more detection regions are simultaneously illuminated and shielded.

Figure 4:
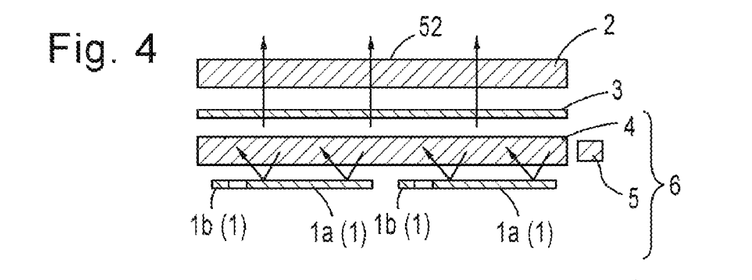
FIG. 4 is an exploded cross-sectional view of a second light-emitting switch element 52 of the present invention.
Figure 5:
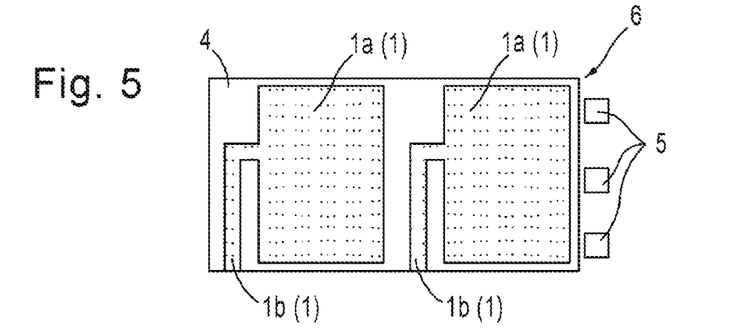
FIG. 5 is a back view showing the formation of a reflecting layer for the light emitter in FIG. 4.

In an embodiment which provides a reflecting layer having an electrode unit 1a and a conductive unit 1b, there are two or more pairs of an electrode unit 1a and a conductive unit 1b (refer to FIGS. 4 and 5). In the second light-emitting switch element 52, two pairs of switch parts comprising an electrode unit 1a(1) and a conductive unit 1b(1) align in the right and left direction.

Figure 10:
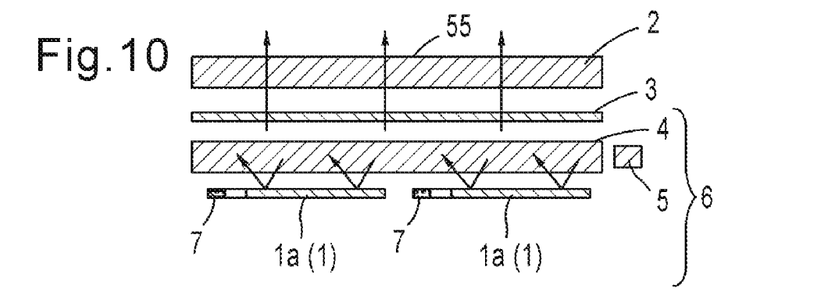
FIG. 10 is an exploded cross-sectional view of a fifth light-emitting switch element 55 of the present invention.
Figure 11:
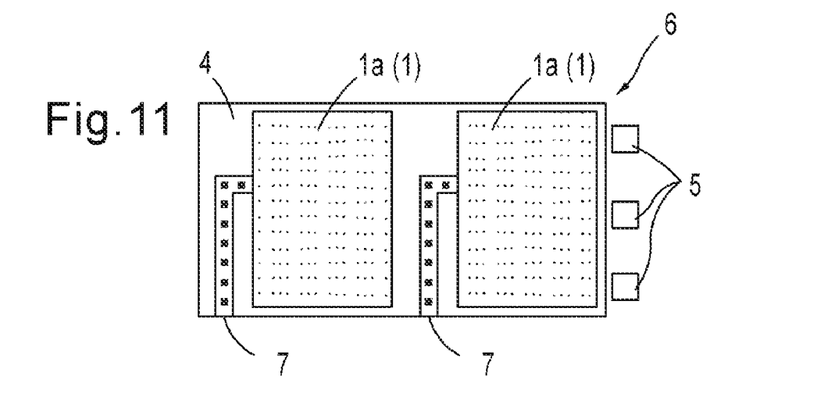
FIG. 11 is a back view showing the formation of a reflecting layer for the light emitter in FIG. 10.

In an embodiment which provides an electric conductor 7 and a reflecting layer 1 having an electrode unit 1a, there are two or more pairs of an electrode unit 1a and an electric conductor 7 (refer to FIGS. 10 and 11). In the fifth light-emitting switch element 55, two pairs of switch parts comprising an electrode unit 1a(1) and an electric conductor 7 align in the right and left direction.

In the case of N detection regions (N being a positive integer of 2 or more), the control element may have one oscillating circuit and one checking circuit and may, by time-sharing, detect and check each of the inputs from N electrode units. Furthermore, the control element may also have N pairs of circuits that have one oscillating circuit and one checking circuit.

Figure 6:
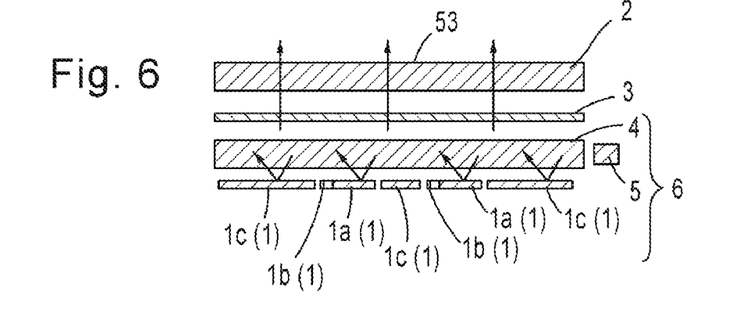
FIG. 6 is an exploded cross-sectional view of a third light-emitting switch element 53 of the present invention.
Figure 12:
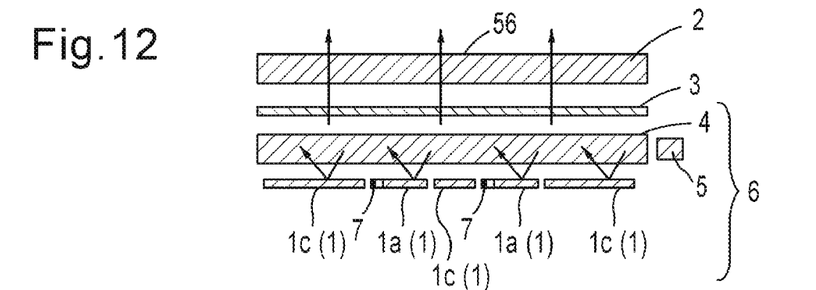
FIG. 12 is an exploded cross-sectional view of a sixth light-emitting switch element 56 of the present invention.

In the light-emitting switch element of the present invention, the reflecting layer 1 may be also formed to have a non-conducting part 1c (refer to FIGS. 6 and 12). In the light-emitting switch element of the present invention, in the case that only a partial region of the panel is available for entry, there exists no electrode unit 1a in the region unavailable for entry. In the region where there exists no electrode unit 1a, it is preferable to arrange the non-conducting part 1c, which does not function to detect the change in capacitance, as part of the reflecting layer. This is because making only the desired detection region an electrode unit, thereby prevents an error in entry. Furthermore, in the case that such region unavailable for entry is formed to have no reflecting layer; light leaks to the back side of the light emitter. Accordingly, the formation of a reflecting layer on such region as well ensures the effective use of light from the point light source 5 etc.

The non-conducting part 1c may be formed by forming an opaque metal film on the whole surface of the reflecting layer 1 and then leaving the region that is to serve as a non-conducting part without etching when the electrode unit 1a and/or the conductive unit 1b are formed by the photolithoetching.

In the third light-emitting switch element 53, a non-conductive part 1c is formed between two electrode units 1a adjacent to each other in the right and left direction. In the sixth light-emitting switch element 56, a non-conductive part 1c is formed between two electrode units 1a adjacent to each other in the right and left direction.

Figure 7:
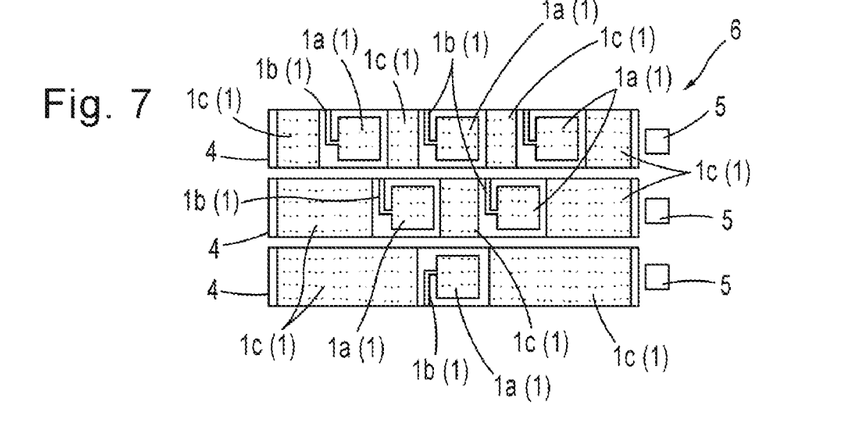
FIG. 7 is a back view showing the formation of a reflecting layer for the light emitter in FIG. 6.
Figure 13:
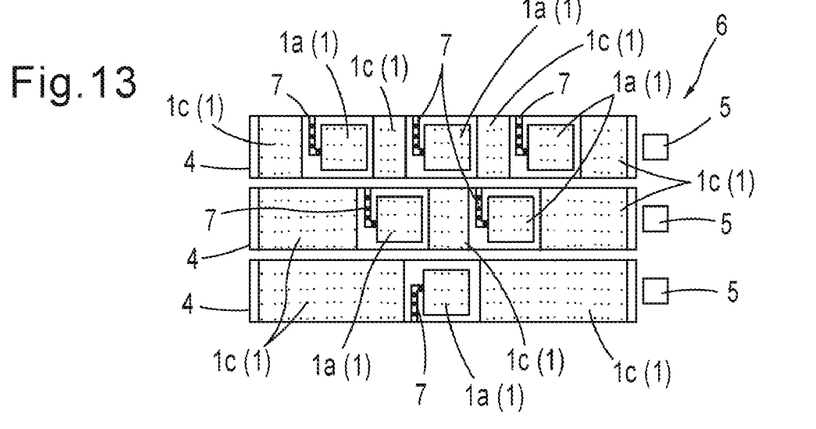
FIG. 13 is a back view showing the formation of a reflecting layer for the light emitter in FIG. 12.

In the light-emitting switch element of the present invention, two or more light guide plates 4 may be arranged and there may be two or more formation patterns of the reflecting layer 1 (refer to FIGS. 7 and 13). For example, in the formation pattern, the number of the electrode unit 1a, existence or nonexistence of the conductive unit 1b or the non-conductive part 1c, the arrangement position and area of them, etc. may not be equal on all area of the reflecting layer. That is to say, in a plurality of switch regions shown on a single panel, there may be provided light-emitting switch elements that are rich in design, different in timing of illumination and shielding, different in shape of the switch region, etc.

In the third light-emitting switch element 53, there are provided three light guide plates 4, which are arranged in the up and down direction in FIG. 7. Each of the light guide plates 4 has a different number and position of the electrode unit 1a, a different number and position of the conductive unit 1b, and a different number and position of the non-conductive part 1c. In the sixth light-emitting switch element 56, there are provided three light guide plates 4, which are arranged in the up and down direction in FIG. 13. Each of the light guide plates 4 has a different number and position of the electrode unit 1a and a different number and position of the non-conductive part 1c.

The reflecting layer 1 may function, on its own, to reflect light for the light guide plate 4, but it may function to subsidiarily reflect light in the case that on the reflecting layer 1 there is another layer, which does not have a function as an electrode but functions to reflect light.

EXAMPLE

Example 1

On a transparent polyethylene terephthalate film (thickness: 75 μm) was a polyester-based anchor layer coated, on which then an opaque metal film made of silver was formed by vacuum evaporation. After that, a photoresist layer was formed on the desired region of the metal film. The resulted metal film was formed by etching so that it has a plurality of electrode units and conductive units connected to each of the electrode units, to obtain a reflecting layer. The opaque metal layer had a surface resistance of $0.8\Omega/cm^2$ measured by the four-point probe array measurement method.

The entire surface of a polyethylene terephthalate film (thickness: 100 μm) was gravure printed by using gray ink. After that, all area, except area that is to be illuminated and displayed, of such gravure-printed polyethylene terephthalate film was gravure printed by using black ink to obtain a smoke-tinted decorated film.

A polycarbonate light guide plate (thickness: 0.6 mm) having light reflecting asperities on the back side thereof was obtained by the injection molding method. In this case, a die the cavity surface of which was microfabricated was used.

Next, the reflecting layer and the light guide plate were laminated on a plastic frame from the bottom, and then commercial diffusion sheets and lens sheets were laminated further. After that, an LED was arranged on the side of the light guide plate to obtain an edge light type backlight.

Next, the decorated film was pasted uniformly on the under side of a transparent acrylic sheet (thickness: 1 mm) by using transparent polyacrylic acid adhesive. Around the resulted sheet was acrylic two-side tape arranged. After that, the sheet was pasted on the under side of the edge light type backlight to obtain a light-emitting switch element.

Example 2

A light-emitting switch was obtained as described in Embodiment 1, except that when a metal film described above was chemically etched, a reflecting layer was formed so that it has only a plurality of electrode units. Flexible board, which was electric conductor, was connected to each electrode unit by soldering.

Example 3

The light-emitting switch element obtained in Example 1 or Example 2 was built into the operation panel of an air conditioner, and then the conductive unit arranged on the reflecting layer was connected to the control element of a capacitance type touch panel. In the operation panel, the smoke-tinted decorated pattern can be seen from the operator side when light is not emitted. Therefore, the existence of the switch is not observed. However, when the main 6 power supply of the air conditioner is switched on, the light source of the switch element glows and the switch pattern appears with light. When the switch unit was touched, the air conditioner functioned to set an air volume, temperature, etc. without any error. Furthermore, with sufficient amount of light, the switch pattern was clearly visually observed.

The invention claimed is:

1. A capacitance type light-emitting switch comprising:
   a light-emitting switch element comprising
      a panel made of transparent materials,
      a decorated layer arranged on at least one side of said panel,
      a light guide plate arranged on back sides of said panel and said decorated layer,
      a point light source or a line light source arranged on a side of said light guide plate, and
      a reflective layer that is made of an opaque metal film of less than $1\Omega/cm^2$ of surface resistance measured by a four-point probe array measurement method, mounted on the back side of said light guide plate, and is formed to have an electrode unit and a conductive unit connected to said electrode unit; and
   a control element that is connected to said electrode unit through said conductive unit, being capable of switching a circuit for an external loading device, depending on a change in the capacitance of said electrode unit.

2. A light-emitting switch element used as configuration part of a capacitance type light-emitting switch, comprising
   a panel made of transparent materials,
   a decorated layer arranged on at least one side of said panel,
   a light guide plate arranged on back sides of said panel and said decorated layer,
   a point light source or a line light source arranged on a side of said light guide plate, and
   a reflective layer that is made of an opaque metal film of less than $1\Omega/cm^2$ of surface resistance measured by a four-point probe array measurement method, mounted on the back side of said light guide plate, and is formed to have an electrode unit and a conductive unit connected to said electrode unit.

3. The light-emitting switch element according to claim 2, wherein said reflecting layer is integrally formed on the back side of said light guide plate.

4. A light-emitting switch element used as configuration part of a capacitance type light-emitting switch, comprising
   a panel made of transparent materials,
   a decorated layer arranged on at least one side of said panel,
   a light guide plate arranged on back sides of said panel and said decorated layer,
   a point light source or a line light source arranged on a side of said light guide plate,
   a reflective layer that is made of an opaque metal film of less than $1\Omega/cm^2$ of surface resistance measured by a four-point probe array measurement method, mounted on the back side of said light guide plate, and is formed to have an electrode unit, and
   an electric conductor to be connected to said electrode unit of said reflective layer.

5. The light-emitting switch element according to claim 4, wherein said reflective layer and said electric conductor are integrally formed on the back side of said light guide plate.

6. The light-emitting switch element according to claim 2 or claim 4, wherein said reflective layer is formed to have a non-conductive unit.

7. The light-emitting switch element according to claim 2 or claim 4, wherein a material of said metal film is any one of silver, copper, aluminum, gold, nickel, and stainless steel.

8. The light-emitting switch element according to claim 2 or claim 4, wherein a front side of said metal film is coated with a dielectric enhanced reflection film.

9. The light-emitting switch element according to claim 2 or claim 4, wherein, wherein said reflective layer is formed to have two or more said electrode units.

10. The light-emitting switch element according to claim 2 or claim 4, wherein two or more light guide plates are arranged and there are two or more kinds of formation patterns for said reflecting layer.

* * * * *